United States Patent [19]

Nagai et al.

[11] Patent Number: 4,982,373
[45] Date of Patent: Jan. 1, 1991

[54] FLUID AGITATOR

[75] Inventors: Yataro Nagai; Sanjiro Nagai; Mitsuyoshi Matsushita; Hiroshi Ohbori; Yuji Yamauchi, all of Tokyo, Japan

[73] Assignee: Tanken Seiko Kabushiki Kaisha, Tokyo, Japan

[21] Appl. No.: 423,648

[22] Filed: Oct. 17, 1989

Related U.S. Application Data

[63] Continuation of Ser. No. 45,056, filed as PCT JP86/00425 on Aug. 19, 1986, published as WO87/01052 on Feb. 26, 1987, abandoned.

[51] Int. Cl.$^5$ .............................................. B01F 7/16
[52] U.S. Cl. .................................... 366/279; 366/601
[58] Field of Search ............... 366/601, 279, 251, 341, 366/342, 343, 64, 65, 290; 310/86, 87, 258, 55, 57; 384/610, 907.1

[56] References Cited

U.S. PATENT DOCUMENTS

| | | | |
|---|---|---|---|
| 1,059,313 | 4/1913 | Perkins | 384/610 |
| 2,224,806 | 12/1940 | Benson | 366/279 X |
| 2,278,624 | 4/1942 | Packer | 366/279 X |
| 3,113,227 | 12/1963 | Bomberger | 310/55 |
| 3,240,967 | 3/1966 | Krastchew | 310/55 |
| 3,591,243 | 7/1971 | Knippenberg | 384/907.1 |
| 4,426,592 | 1/1984 | Berzin | 310/258 X |
| 4,427,908 | 1/1984 | Halmai | 310/57 |

FOREIGN PATENT DOCUMENTS

| | | | |
|---|---|---|---|
| 234415 | 1/1945 | Fed. Rep. of Germany | 384/610 |
| 53013 | 8/1966 | Japan | 366/279 |
| 90033 | 5/1985 | Japan | 366/279 |
| 1321450 | 7/1987 | U.S.S.R. | 366/279 |
| 18350 | of 1913 | United Kingdom | 366/279 |

Primary Examiner—Robert W. Jenkins
Attorney, Agent, or Firm—Henry C. Nields

[57] ABSTRACT

The present invention relates to a fluid agitator which may stir fluid in a closed space without leakage of the fluid. The fluid agitator has a motive means and a bearing means installed in the closed space.

In the fluid agitator employing a electric motor as the motive means, only the stator coil of the motor which is weak in its resistance against high temperatures and humid atmosphere is sealed in a sealing chamber. The sealing chamber may be provided with a cooling device to cool the inside thereof. The driving shaft of the motor is supported by a bearing having resistance to high temperatures and high humidity and is provided with an agitating blade.

In the fluid agitator employing a turbine system as the motive means, a turbine chamber and a turbine blade are set in the closed space. A fluid supply is furnished to introduce fluid into the turbine chamber from outside of the closed space for driving and rotating the turbine blade. The turbine blade is connected to an agitating blade through a rotation transmission.

4 Claims, 5 Drawing Sheets

FLUID AGITATOR

This application is a continutation of application Ser. No. 045,056, filed as PCT JP86/00425 on Aug. 19, 1986, published as WO87/01052 on Feb. 26, 1987 now abandoned.

TECHINICAL FIELD

The present invention relates to a fluid agitator which stirs fluid, that is liquid and gas or the like, in a closed space.

BACKGROUND ART

Fluid agitating is sometimes required under increased pressure, under reduced pressure or at high temperature in a closed space, for example in a reaction chamber, an autoclave, a rubber vulcanizer, an electric furnace, a heat treatment furnace, a culture chamber, or the like. The fluid agitating in such closed space is required to uniformly and promptly to distribute the temperature and/or the humidity thereof, or to activate the reactive fluid.

Apparatus for achieving such agitating includes a motive means, e.g. a motor or the like equipped outside of the closed space, and a rotating shaft attached to the motor, the shaft being provided with an agitating blade. The rotating shaft passes through a partition into the closed space amd stirs the fluid therein by means of the agitating blade.

With such apparatus, the hole must be formed in the partition to enable the shaft to pass through, and a seal must be provided around the shaft. A mechanical seal, a labyrinth seal, an oil seal, a gland packing or the like are generally utilized for sealing of such rotation shaft. As is well known, such shaft sealing devices are not able completely to prevent leakage of the fluid from the closed space. Where the inner pressure or the temperature of the closed space is very high, and/or where the shaft rotates at high speed, such sealing devices cannot retain their sealing ability. This lowers the reliability of the equipment using it. In fact, accidents occurred where lubricating oil, which has leaked from a double type mechanical seal into the inside of the closed space, was subject to high temperature and ignited.

Thus it was not generally possible to obtain satisfactory equipment in which fluid required to be stirred was disposed in a closed space. There are many fields, e.g. a high temperature and pressure moisture curing vessel for light bubble concrete, where the use of an agitating fluid in the closed spaced in not practiced, notwithstanding the fact that agitation of such fluid would be clearly effective and advantageous.

If a fluid agitator could be provided which substantially agitates the fluid under temperature and high pressure condition in a closed space without accidents, e.g. without leakage and/or ignition, it would be applicable for many fields of industry.

SUMMARY OF THE INVENTION

Accordingly it is an object of one aspect of this invention to provide a fluid agitator which does not utilize a rotating shaft passing through a partition of a closed space within which the fluid to be agitated is disposed.

It is an object of another aspect of this invention to provide a fluid agitator which can agitate the interior of a closed space with high reliability under condition of high temperature, high pressure and/or high humidity.

It is an object of a further aspect of this invention to provide a fluid agitator which can agitate fluid in a closed space at the high speeds without significant leakage of the fluid out of the closed space.

By one broad aspect of this invention, a fluid agitator for agitating liquid, gas or the like in the closed space, is provided, comprising a motor including a stator coil sealed in a sealing chamber, an agitation blade connected to the driving shaft of the motor, and a bearing which has resistance to high temperature and/or high humidity supporting the driving shaft. In one embodiment thereof, the sealing box may be provided with a cooling device to cool the inside thereof.

With such construction according to one embodiment of the invention, the motor safely enables agitation without problems in a high temperature, and/or high pressure, and/or high humidity atmosphere of the closed space since the stator coil having slight resistance to high temperature and/or high pressure and/or high humidity is set and sealed in the sealing chamber. Consequently, the interior of the closed space can be reliably stirred without the need for passing of a rotating shaft through a partition of the close space.

By another broad aspect of this invention a fluid agitator is provided including a turbine chamber which is installed in a closed space. Although it is not required for the turbine chamber to be prefectly sealed, and even though some leakage may be allowed to the extent of the limit of the present art, it is preferred to minimize the leakage of the fluid into the turbine chamber or the leakage of the fluid for driving the turbine into the closed space.

A turbine blade is set in the turbine chamber. A fluid supply is provided including means to introduce the fluid into the turbine chamber for driving and rotating the turbine blade. The fluid which has driven the turbine blade may be exhausted into the outside of the closed space by an appropriate discharging device, or may be leaked into the closed space, such leakage does not give rise to other problems. The turbine blade is connected to a transmission which transmits the rotation of the turbine blade to the outside of the turbine room. The agitation blade is connected to the transmission outside of the turbine room.

Gas, air, inert gases, e.g. $N_2$, Ar, or the like, liquid or steam can be employed as the fluid for driving the turbine blade.

Though a designated fluid, gas or steam may be supplied for driving the turbine blade, the fluid gas or steam for pressurizing and/or heating the inside of the closed space may be utilized as such driving fluid. The pressure of such gas or steam is reduced to the prescribed value through a reducing valve for such driving use. When such gas or steam is used as the driving fluid such fluids may be introduced directly from the source without passing through a reducing valve into the turbine chamber to drive the turbine blade. The gas or steam which has been used for the driving the turbine may be leaked into the closed space to pressurize or heat the inside thereof or may be exhausted out of the system to heat or pressurize other equipment. The application of such gas or steam for driving effectively reduces the operating cost of the turbine system.

Such embodiment of the present invention provides effective agitation of the fluid in the closed space by inducing the fluid for driving into the turbine room from the outside. The fluid rotates the turbine blade and the rotating is transmitted by the transmission to the agitation blade which stirs the fluid in the closed space.

DETAILED DESCRIPTION OF THE PREFERRED EMBODIMENTS

Figure 1:
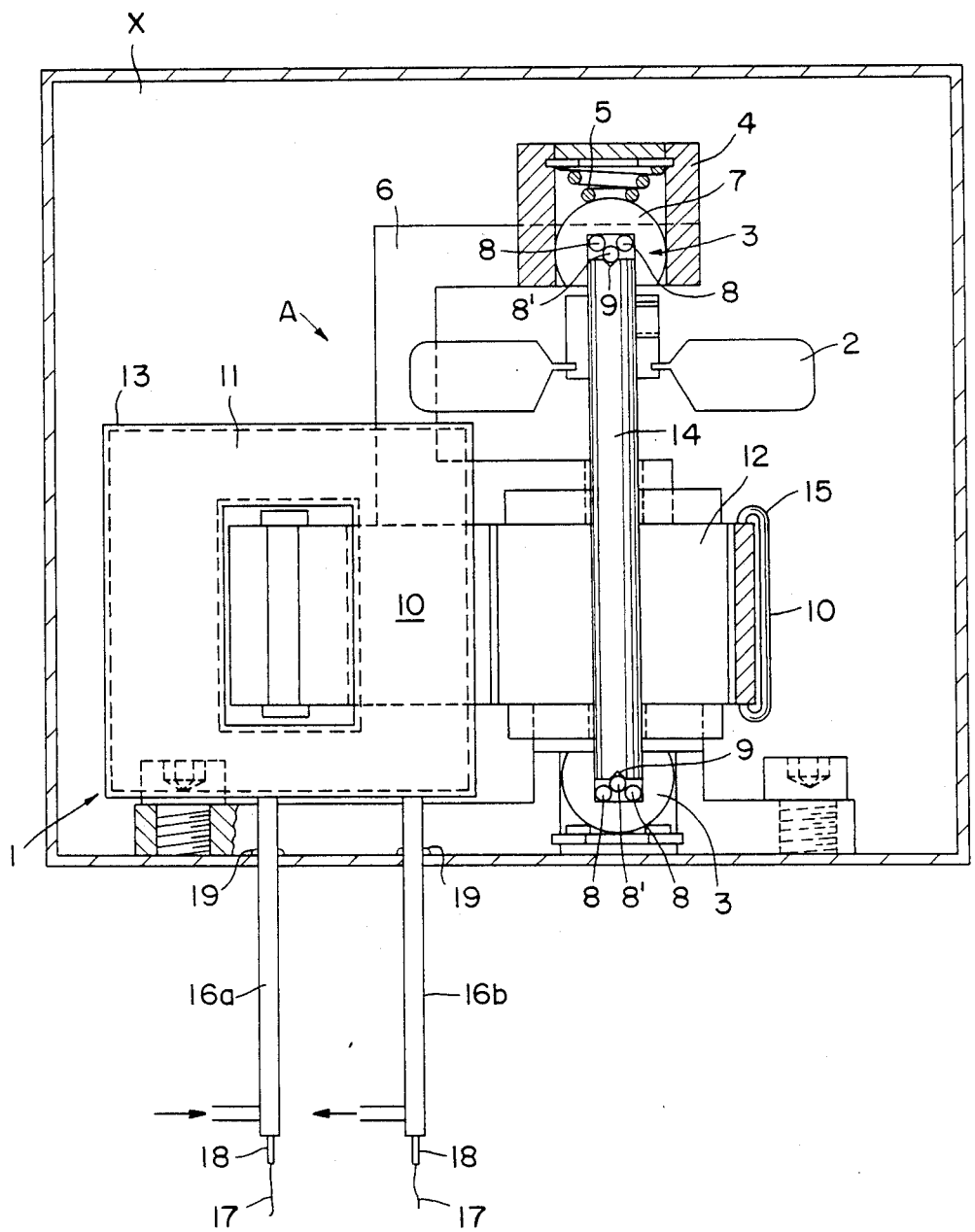
FIG. 1 is an elevational view in section showing one embodiment of the fluid agitator of an aspect of the present invention.
Figure 2:
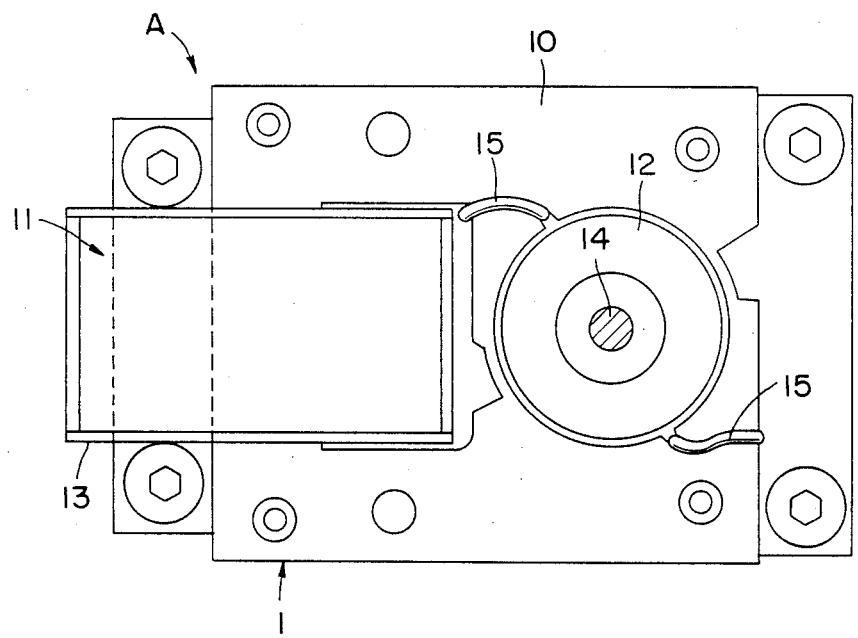
FIG. 2 is a plan view of the embodiment of FIG. 1, FIG. 3 and FIG. 4 are plan views showing an arrangement of balls in a bearing.

Referring to the attached drawings, X indicates a closed space, e.g. a chamber, a furnace or the like. A indicates a fluid agitator of an embodiment of this invention in FIG. 1 and 2. In FIG. 2, the closed space X is omitted for clarity. Though the closed space X is illustrated in FIGS. 1, 2, as a rectangular parallele piped, it may be of any shape, for example it may be ring shape.

The agitator A consists of a motor 1, an agitating blade 2, and a bearing 3. A stator coil 11 of the motor 1 is placed in a closed space X. In this embodiment the stator coil 11 is set and sealed in a sealing chamber 13 made of a stainless steel which protects the stator coil 11 from atmosphere of high temperature, and/or high pressure and/or high humidity in the closed space X. The coil 11 and sealing chamber 13 have the shape of the rectangular ring having the hole in the center, through which a stator 10 passes. The stator 10 has a shape of an almost-square ring with an open edge, whose end faces facing each other are each formed in a semi-circle. An armature 12 is installed between the end faces.

With such construction, the stator coil 11 is protected by the sealing box 13, which does not magneticically affect the motor 1 because the sealing box 13 is not interposed between the stator 10 and the armature 12.

The sealing box 13 may be cooled according to demand. In the embodiment shown, the sealing box 13 is provided with two communication pipes 16a and 16b which extend outwardly through the partition of the closed space X. The holes in the partition through which the communication pipes 16 pass are sealed by O rings 19, 19 or other equivalent sealing means. The communication pipe 16a is connected to a source of cooling gas (not illustrated), and carries the gas to the sealing box 13 for cooling the stator coil 11. The communication pipe 16b is for the purpose of exhausting the cooling gas. The communication pipe 16b may be open to the air or may be connected to a suction pump (not illustrated) or the like. The communication pipe 16a, 16b also serve as the extending pipes for a cord 17 of the stator coil 11, from which the cord 17 projects through a seal 18. The sealing box 13 may be provided with a covering jacket or the like over the outside, and may be cooled by the cooling gas introduced therebetween. Many other embodiments for cooling the sealing box 13 can be employed within the scope of this invention.

The armature 12 is provided with a vertically-extending driving shaft 14 which is supported by bearing 3, 3 at the top and bottom ends thereof. An agitating blade 2 is fixed to the upper part of the driving shaft 14. The agitating blade 2 is made of any metallic material which is resistant to high temperature and/or high humidity. The bearings 3 consist of supports 7,7 which have a semi-spherical shape and include balls 8 therein. The supports 7 have holes therein which hold a plurality of balls 8 which rotatably support the end of the driving shaft 14 disposed therein. The upper support 7 is held in a supporting box 4 by the spring 5 which absorbs the vertical movement of the driving shaft 14. The supporting box 4 includes the foot 6 having the crank shape which supports the supporting box 4 on the stator 10.

Figure 3:
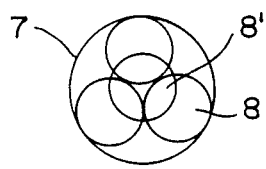
Figure 4:
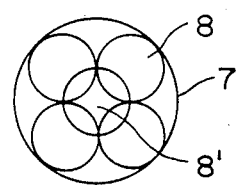
Figure 5:
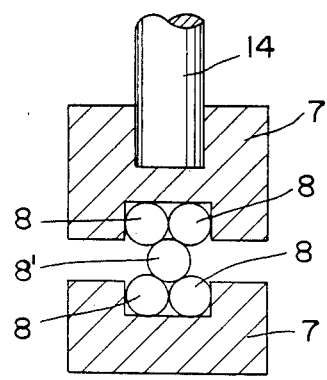
FIG. 5 is an enlarged section view showing another embodiment of the bearing.

In this embodiment, the bearing 3 has the inventive construction which is resistant to high temperature and/or high speed rotation without an oil-supply. As shown in FIGS. 3 and 4, the support 7 holds a plurality of the balls 8. A second ball 8' is disposed in rotatable contact with each of ball 8. The ball 8' is placed in a cone-shaped groove 9 formed on an end face of the driving shaft 14. The driving shaft 14 is supported by the ball 8', which is in rolling contact with the groove 9. A material which does not require lubricating oil and which has high wear and corrosion resistance is preferably utilized for the support 7 and the ball 8,8'. For example, carbon, SiC, cemented carbide, sapphire, ceramics or the like may be utilized. The material may be selected depending on the characteristic and the temperature of the fluid to be stirred. The number of the ball 8,8' and-/or of the packing of the ball 8,8' are optional. For example, FIG. 5 shows the embodiment where the driving shaft 14 has a pair of supports 7, one at each upper and lower end thereof and the balls 8 are packed in three steps, that is, the balls 8 are placed in each of the supports 7 and the balls 8' is placed between the pair of the supports 7 and in rolling contact with balls 8.

The inventive bearing having the construction mentioned above does not need an oil supply and is wear-resistant because the amount of rolling contact of the balls is less than that of the conventional pivot bearing. Consequently the high PV value is obtained with such bearing in a high temperature atmosphere or liquid, and the driving shaft 14 can be resistant to high speed rotation.

The material of the driving shaft 14 of the armature 12 and of the stator 10 may be selected depending on the atmosphere in the closed space X. 15 indicates the shading coil in FIGS. 1 and 2.

In such construction, since the stator coil 11 which is least resistant to high temperature, and/or high pressure and/or humidity is set and sealed in the sealing box 13, the motor 1 may provide rotation without problems in such atmosphere of high temperature, and/or high pressure, and/or high humidity and makes the agitating blade 2 effectively agitate the fluid in the closed space X. When the cooling of the sealing box 13 is carried out, the heat resistance is further increased. Moreover, since the sealing box 13 does not interfere with the magnetic field between the stator 10 and the armature 12, and does not magnetically affect them, the powers of the motor 1 is the same as that of an ordinary motor. The bearing which is resistant to high temperature, and/or high pressure and/or humidity without an oil supply bears the driving shaft 174 so that the driving shaft 14 can rotate without problems and maintain substantial stirring by the agitating blade 2.

Figure 6:
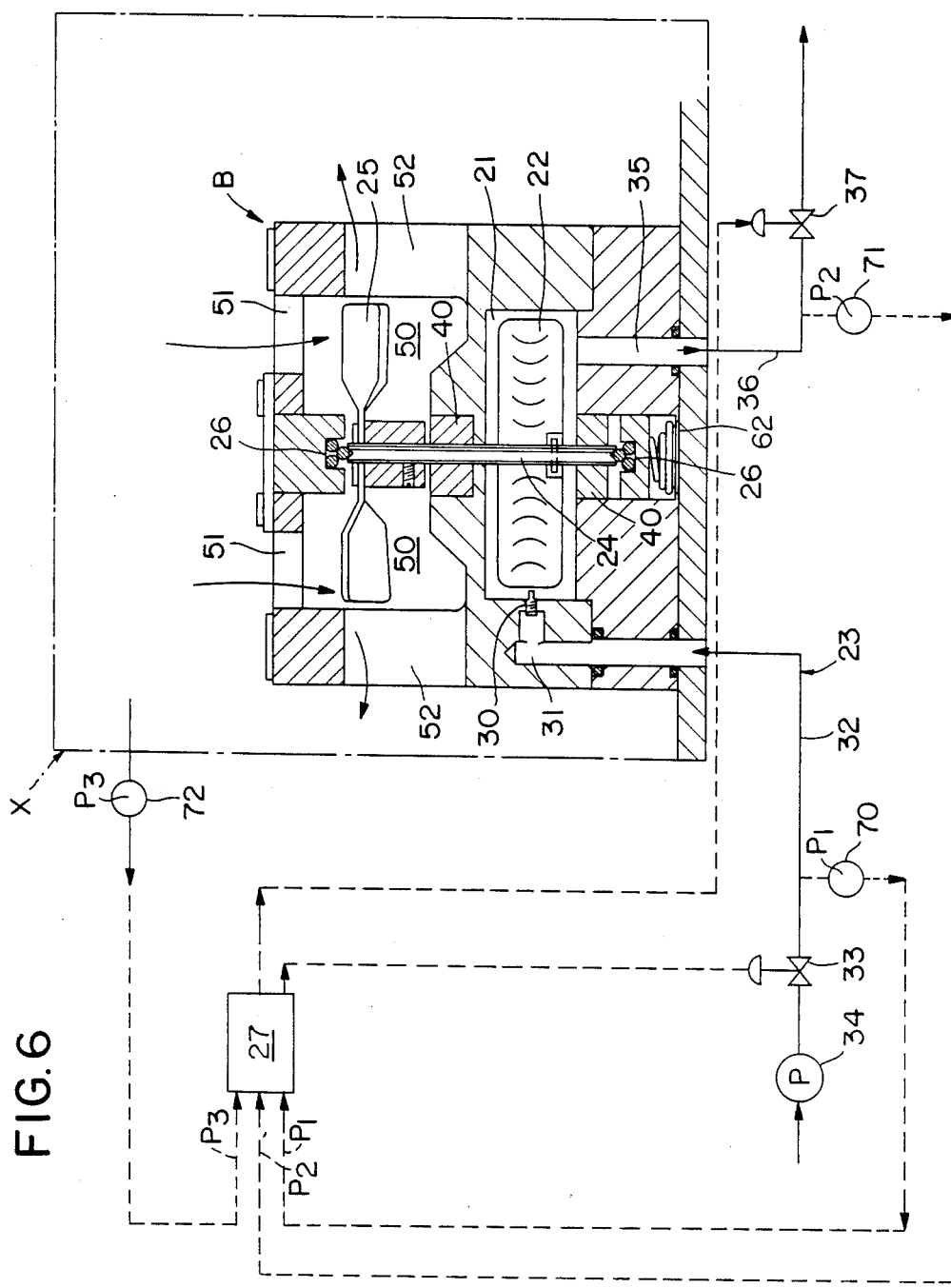
FIG. 6 is an elevational view in section showing another embodiment of the agitator of another aspect of this invention.
Figure 7:
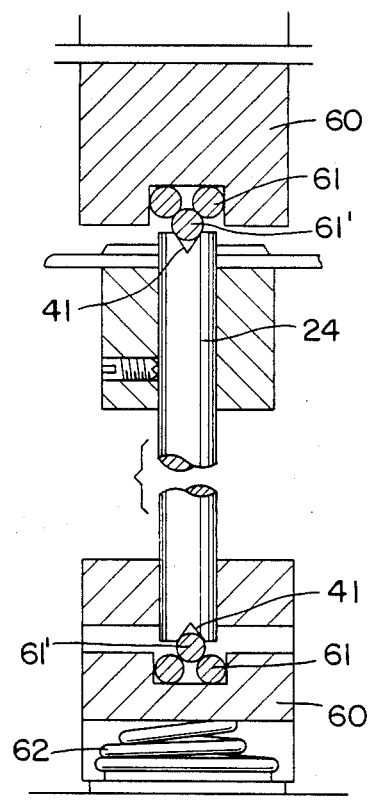
FIG. 7 is an enlarged section view showing the bearing part of the embodiment of FIG. 6.

Referring now to FIGS. 6, 7, another embodiment of the invention is shown. In FIG. 6, a fluid agitator B of one aspect of the invention is installed in the closed space X which is provided with the fluid to be stirred. The agitator B is cylindrical in shape, whose under part is a turbine room 21. The upper part constitutes a space for the agitation blade 25 to rotate therein.

A turbine blade 22 is furnished in a turbine chamber 21 so as to rotate horizontally therein by means of driving fluid for driving the turbine blade 22 supplied from an injection nozzle 30 having a small bore. The injection nozzle 30 is set into the inner side-wall of the turbine chamber 21 and is connected with an introduction pipe 32 through a conduit hole 31 which passes through the bottom of the turbine chamber 21. The introduction pipe 32 extends out of the closed space X passing through the wall of the closed space X, and is connected with a fluid source (not shown) through a control valve 33 and a condenser, pump, blower or the like 34. The control valve 33 is controlled by the pressure controller 27 to be described hereinafter. The injection nozzle 30, the conduit hole 31, the introduction pipe 32, the control valve 33, the condenser, pump, blower or the like 34, and the fluid source constitute a fluid supply device 23.

In this embodiment, the fluid which has driven the turbine blade 22, is exhausted out of the turbine chamber 21 to the outside of the closed space X. A discharge hole 35 is formed in the bottom of the turbine chamber 21, which is connected to a discharge pipe 36, passes through the wall of the closed space X and extends outside of it. The discharge pipe 36 is provided with a control valve 37 which is also controlled by the pressure controller 27. The fluid which has driven the turbine blade 22 is exhausted through the discharge hole 35, the discharge pipe 36 and the control valve 37. It is easy completely to seal the part of the closed space X where the introduction pipe 32, the excluding pipe 36 pass through, and the prevent fluid leakage from the closed space X because the introduction pipe 32, and the discharge pipe 36 are not rotatable, but in the other hand, are stationary.

The turbine blade 22 is secured vertically on the driving shaft 24 which is set in the turbine chamber 21 and is supported by the bearings 26,26 at each upper and lower end thereof. The top and bottom of the turbine chamber 21 where the driving shaft 24 passes through is provided with a bearing and shaft seal 40,40 to improve the sealing performance of the turbine chamber 21. Many embodiments may be employed as the bearing and shaft seal 40; for example, a labyrinth seal with a bushing is utilized in FIG. 6. The material of the bearing and shaft seal 40 is preferably a solid-lubricant, e.g. carbon, ceramics or the like, where it is used in high temperature of the closed space X.

The agitation blade 25 is set at the upper end of the driving shaft 24. The driving shaft 24 transmits the rotation of the turbine blade 22 to the agitation blade 25. The driving shaft 24 is the means in this embodiment to transmit the rotation of the turbine blade 22. The agitation blade 25 rotates horizontally in rotation space 50 of the agitator B. The agitator B is provided with an inlet 51 at the top face thereof for the introduction of the fluid to be agitated into the rotation space 50, and with an outlet 52 at the upper part of side wall. The rotation of the turbine blade 22 induces flow of the fluid in direction of the arrows in FIG. 6. The flow serves to stir the fluid in the closed space X. The setting position, scale, number and the like of the inlet 51 and/or the outlet 52 may be determined depending on the position of the agitator B in the closed space X and/or the amount of flow required substantially to agitate the fluid.

The material of the turbine blade 22, the bearing and shaft seal 40 or other elements may be selected at will. In the embodiment, carbon material is utilized so as to make the turbine blade 22 light and the bearing and shaft seal 40 into the oil-less bearing. Other materials, for example, organic material, inorganic materials, metals, or complex materials made thereof can be utilized if such material is light and can be lubricated without oil.

When the fluid to be stirred is liquid, it is preferred to use gas as the fluid for driving the turbine blade 22 and to provide no discharge hole and pipe in the turbine chamber 21. With such construction, the gas to drive the turbine blade 22 leaks from the bearing and shaft seal 40 into the sealed space X and forms a bubble in the liquid and aids in agitation of the liquid.

The introduction pipe 32 and the discharge pipe 36 each have a pressure gauge 70 and 71 which measure the pressures P1, P2 thereof. The pressure gauge 72 to measure pressure P3 is set in the sealed space X. The pressure value P1, P2, and P3 input to a pressure controller 27 which controls the control valve 33,37 so as to make the following pressure condition: $P1 = P2 + \Delta P$. Though $\Delta P$ may be determined depending on the required speed of the rotation of the turbine blade 22, $\Delta P$ is usually set at several atm. The pressure controller 27 also controls P2 to be almost equal to P3 in order to prevent the fluid which is to be stirred from leaking into the turbine chamber 21 through the bearing and shaft seal 40 or to prevent the fluid which is used to drive the turbine blade 22 from invading into the sealed space X.

Referring to FIG. 7, a bearing is shown which has also the inventive construction which is resistant to high temperature and/or high speeds of rotation without oil supply. In the same manner as the construction shown in FIGS. 3 and 4, the supports 60,60 hold a plurality of the balls 61 and hold a ball 61' in rotational contact with the balls 61 in a well therein. The ball 61' is placed in cone shaped groove 41, which is formed on each end face of the driving shaft 24. The ball 61' supports the driving shaft 24 in sliding contact with the groove 41. A material which does not require lubricating oil and which has high wear and corrosion resistance is preferably utilized for the support 60 and/or for the ball 61. Examples of such material include carbon SiC, cemented carbide, sapphire, ceramics or the like. The material may be selected depending on the characteristics and the temperature of the fluid to be stirred. The number of the balls 61,61' and/or the stacking of the balls 61, 61' are also optional. In the same manner shown in FIG. 5, such construction may be employed that the driving shaft 24 has a pair of the supports 60 and has the balls stacked in three steps; that is the ball 61 are placed in each support 60 and the ball 61' is disposed between the pair of the support 60.

The lower support 60 is vertically movable and is supported by the spring 62 in order to absorb such movement as caused by the heat of expansion of the driving shaft 24.

The inventive bearing having the construction mentioned above does not need any oil supply and is wear-resistant because the amount of sliding of the ball 61 is less than that of the conventional pivot bearing. Consequently the high PV value is obtained with such bearing in a high temperature atmosphere or liquid, and the driving shaft 24 can be resistant to high speed rotation.

In such construction, the turbine blade 22 rotates by supplying the fluid, e.g. air, from the fluid supply 23, and simultaneously rotates the agitation blade 25, which induces stirring flow of the fluid in the closed space. There is no significant leakage of the fluid out of the closed space, because such construction includes no rotating shaft passing through the partition of the closed space X.

INDUSTRIAL APPLICABILITY

This invention may be applied to a reaction chamber, an autoclave, a rubber vulcanizer, an electric furnace, a heat treatment furnace, a culture chamber, a moisture curing vessel for the light bubble concrete, and the like whose inner space is closed and is in high temperature, and/or under high pressure and/or high humidity and is hard or impossible to be agitated by the conventional art.

What we claim is:

1. In combination with a container holding fluid to be stirred, a fluid agitator supported within said container and comprising at least one agitation blade, a rotatable support for said blade, means for rotating said support, and a sealing chamber within said container, wherein said means for rotating said support comprises a motor having a stator and a stator coil, where said stator coil thereof is within said chamber and said stator is outside said chamber but within said container; and wherein said rotatable support is mounted on a bearing; said bearing having resistance to at least one of the conditions of high temperature and humidity, said container and said chamber being unbroken by any rotating member passing therethrough.

2. Apparatus according to claim 1, further comprising: means for injecting a cooling medium into said sealing chamber from outside said container and means for exhausting said cooling medium from said sealing chamber to the outside of said container so as to cool the stator coil in said sealing chamber.

3. Apparatus as claimed in claims 1 or 2, wherein said motor comprises: a stator having approximately the shape of a square bracket havng extremities; a stator coil wound around said stator and sealed by said sealing chamber; and an armature placed between the extremities of said stator.

4. Apparatus as claimed in claim 1 or 5, wherein said bearing for said driving shaft includes a first ball which is adapted to be in sliding contact with an end face of said driving shaft, and a plurality of additional balls adapted to be in rolling contact with said first ball, said additional balls being supported by groove upper and lower supports, said groove upper support being held by further supporting means which absorbs movement of said driving shaft.

* * * * *